Figure 3:
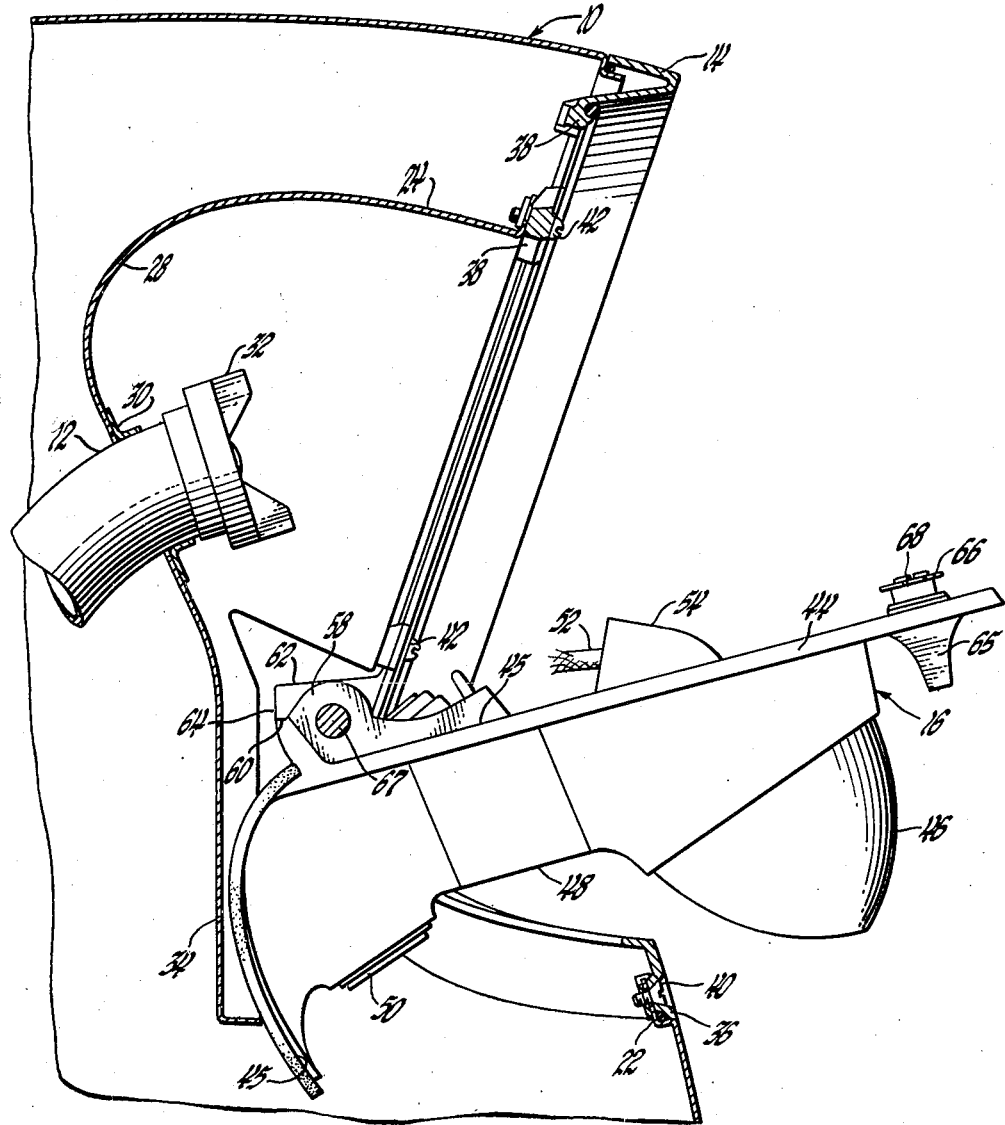

Nov. 12, 1957     D. F. URBAN ET AL     2,812,955
COMBINED HINGED CLOSURE AND LAMP MOUNTING
Filed Oct. 6, 1955     2 Sheets-Sheet 1
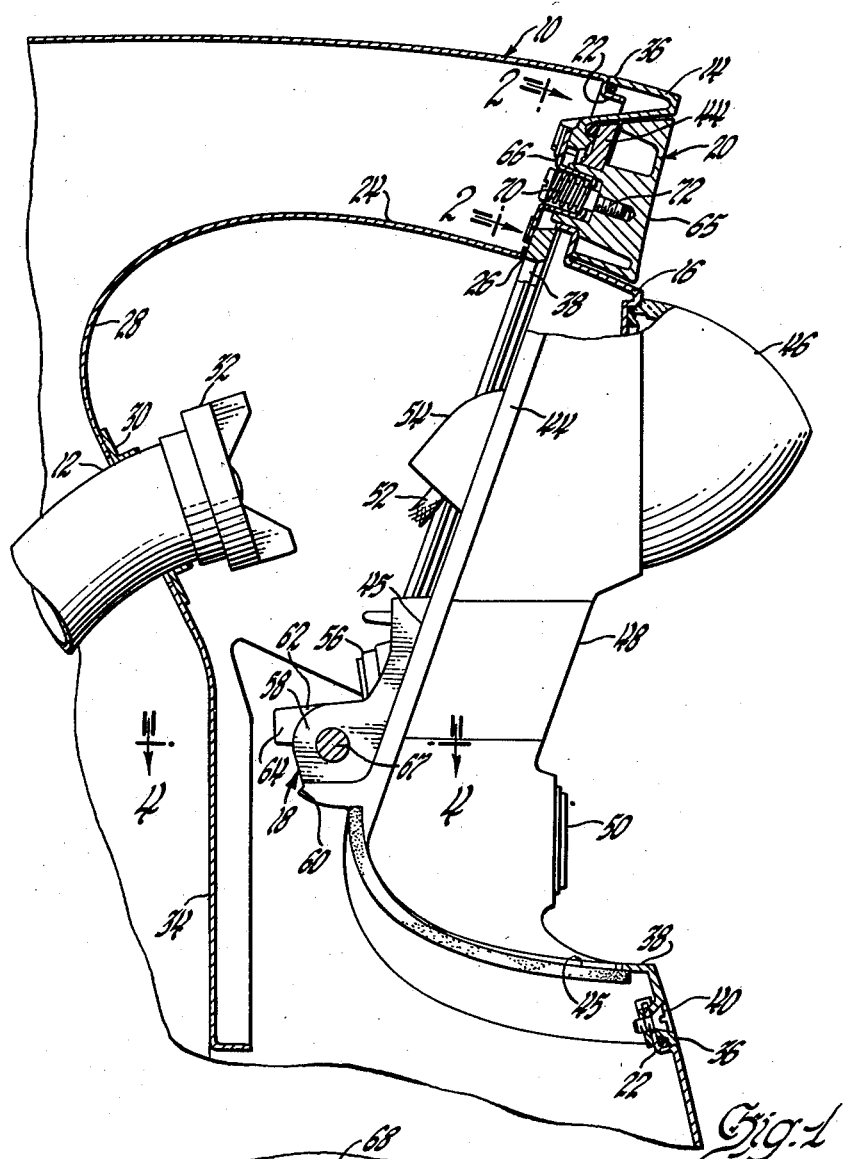

Nov. 12, 1957   D. F. URBAN ET AL   2,812,955
COMBINED HINGED CLOSURE AND LAMP MOUNTING
Filed Oct. 6, 1955   2 Sheets-Sheet 2

INVENTORS
Donald F. Urban &
BY Arnold J. Maletzke
E. W. Christen
ATTORNEY

United States Patent Office 2,812,955
Patented Nov. 12, 1957

2,812,955

COMBINED HINGED CLOSURE AND LAMP MOUNTING

Donald F. Urban, Royal Oak, and Arnold J. Maletzke, Grosse Pointe Farms, Mich., assignors to General Motors Corporation, Detroit, Mich., a corporation of Delaware Application October 6, 1955, Serial No. 538,916

4 Claims. (Cl. 280—152)

This invention relates to an improved vehicle lamp mounting and more particularly to a hinge mounted lamp in a vehicle body panel for permitting access to the fuel tank filling conduit.

The desirability of concealing certain functional parts of an automotive vehicle is well recognized to enhance the appearance and to permit the greatest freedom in design and styling of the vehicle body. Arrangements have been previously proposed for concealing the fuel tank filling conduit in a body panel such as the rear fender and permitting access through a hinge mounted lamp structure. The previous arrangements, however, are subject to certain disadvantages in the requirement of complex and expensive parts such as the hinge and latch structures. In some prior arrangements the hinged member is mounted at a vulnerable location on the body panel and the hinged member extends a considerable distance from the body panel when in the open position thus subjecting the device to accidental damage. Furthermore, the previous arrangements tend to inhibit the freedom of design and styling of the vehicle body.

Accordingly, it is an object of this invention to provide an improved hinge mounted lamp in a vehicle body panel which permits access to the fuel tank filling conduit and which is susceptible of adaptation to a variety of vehicle body styles.

Another object of this invention is to provide a hinge mounted lamp movable between open and closed positions with a minimum of protrusion of the parts while providing ample space to accommodate the fuel tank filling operation.

A further object is to provide a hinge mounted lamp in a vehicle body panel having a self-opening feature which facilitates operation and ensures proper closure by requiring a positive latching operation.

An additional object is to provide an improved hinge mounted lamp structure of unusual ruggedness and stability with a minimum protrusion of parts in either open or closed position and minimizing the liability to accidental damage.

In the accomplishment o fthese objects there is provided a lamp body preferably of L-shaped configuration secured to the lamp housing by a hinge structure disposed intermediate the upper and lower ends of the body. The hinge axis is spaced from the body to provide self-opening and a latch structure disposed at the upper end of the lamp body to secure the parts in the closed position. The assembly of the lamp housing and body is secured over an opening in the vehicle body panel which encloses the fuel tank refilling conduit. Access to the conduit is provided by manipulation of the latch structure and by displacement of the lamp body about the hinge axis.

Figure 4:
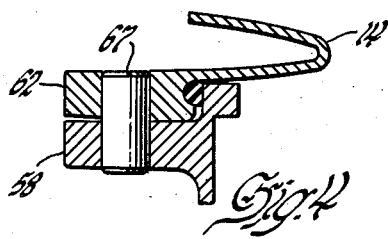

A more complete understanding of the invention may be had from the detailed description which follows taken with the accompanying drawings in which:

Figure 1 is a side view partially in section of the inventive structure with the parts shown in the closed position;
Figure 2 is a view of the latch structure taken on lines 2—2 of Figure 1;
Figure 3 is a side view partially in section with the parts in the open position; and
Figure 4 is a sectional view of the hinge structure taken on lines 4—4 of Figure 1.

Referring now to the drawings, there is shown an illustrative embodiment of the invention in the rear fender and lamp assembly of an automotive vehicle. In general, the arrangement comprises a vehicle body panel or rear fender 10 within which is disposed a fuel tank filling conduit 12. A lamp housing member 14 is secured to the rear fender 10 at the periphery of a rear opening in the fender and defines an access opening to the conduit 12. A lamp body 16, which closes the access opening, is secured to the housing member 14 by a hinge structure, designated generally at 18, and a latch structure, designated generally at 20.

In greater detail, rear fender 10 terminates in a continuous flange portion 22 which defines an opening in the upper and rearmost portion of the fender. In the preferred embodiment the opening, bounded by the flange 22, is of L-shaped angular configuration extending transversely of the fender.

A support plate 24, preferably of stamped sheet metal construction, is bounded by a flange portion 26 which is secured to the fender 10 by any suitable means such as by welding at the peripheral edge thereof. The support plate 24 is provided with a concave enlargement 28 at its upper end constituting access space into which extends the upper end of the fuel tank filling conduit 12 supported by suitable retaining means 30. The conduit 12 is provided with any suitable removable closure cap 32 which may be manipulated within the access space. The support plate 24 terminates at its lower end in a closure portion 34.

The lamp housing 14, preferably a diecast member of substantial rigidity and strength, is of continuous configuration conforming to the contour of the flange 22 on the fender 10. The housing 14 is provided with an outer peripheral flange 36 forming a continuation of the configuration of the fender 10 and an inner peripheral flange 38 which defines an access aperture to the closure cap 32. The housing 14 is suitably secured to the fender 10 by a screw threaded fastener 40 and to the support plate 24 by the screw threaded fasteners 42.

The lamp body 16, preferably a diecast member also, includes a plate or door portion 44 of L-shaped configuration in side elevation and which conforms at the peripheral edge to the configuration of the inner flange 38 of the housing 14. The peripheral edge 45 of plate 44 overlaps flange 38 and is disposed interiorly thereof at the lower portion and exteriorly thereof at the upper portion.

Upon the lamp body 16 is mounted an ensemble of lamps including a tail lamp 46 and back-up lamp 48 as well as a reflector device 50. The lamp 46 is energized through a flexible electrical conductor 52 which is enclosed at its upper end in a suitable protective sheath 54. The lamp 48 may be energized in the same manner by a similar connection, not shown, through an opening in the body 16 defined by the boss 56.

The lamp body 16 is supported on the lamp housing 14 by the hinge structure designated generally at 18. The hinge structure 18 comprises a pair of hinge or bearing elements 58 formed integrally with the body 16 and disposed in lateral alignment on opposite edges of the plate 44. Each of the hinge elements 58 is provided with a shoulder or stop portion 60 to limit the motion of the body 16 in a manner to be described subsequently. Each of the hinge elements 58 is aligned with a corresponding hinge or journal element 62 which is formed integrally with the lamp housing 14. An abutment or stop portion 64 is formed on each of the hinge elements 62 for coaction with the corresponding stop portion 60. Each of the pairs of corersponding hinge elements 58 and 62 is connected by a hinge or pivot pin 67 permitting pivotal motion of the lamp body 16 about the axis thereof. It is noted that the axis of the hinge structure is disposed intermediate the upper and lower ends of the lamp body 16 in the region where the peripheral edge 45 changes from interior to exterior overlapping relation with flange 38. The hinge axis is spaced inwardly from the plate 44 in such manner that the weight of the lamp body 16 causes a rotative moment about the hinge axis. By this arrangement, the lamp body tends to move to the open position shown in Figure 3 under the influence of its own weight with the upper portion of the body displaced rearwardly and the lower portion displaced forwardly.

At the upper end of the lamp body 16 is mounted the latch structure 20 comprising an operating handle 65 and latch element 66. The latch element 66 includes a pair of radially extending portions or fingers 68 and a central cup-shaped portion within which is disposed a coil spring 70. The latch element 66 is non-rotatably secured to the operating handle 65 by a screw threaded fastener 72 extending through the coil spring 70 which resiliently biases the element 66 against axial movement. The housing member 14 defines a horizontal slot 74 in alignment with the latch element 66 and of sufficient length to permit passage of the latch element 66 when the fingers 68 are aligned with the slot. Adjacent the slot 74 and on opposite sides thereof are disposed a pair of inclined cam surfaces 76 within the radial extent of the fingers 68 when the fingers are disposed transversely of the slot 74.

In operation of the inventive assembly, access is gained to the conduit 12 for removal of the cap 32 and refilling of the vehicle fuel tank by release of the latch mechanism 20. This is accomplished by rotation of the operating handle 65 through a quarter-turn in the counterclockwise direction causing the latch element 66 to be aligned with the slot 74 in the housing 14. With the latch released, the body member 16 is self-opening due to the placement of the axis of the hinge structure 18 and tends to swing to the position shown in Figure 3. The opening movement is arrested by the engagement of the shoulder 60 with the abutment 64. In the open position, the upper end of conduit 12 is easily accessible through the access opening in the housing 14. In the open position, by virtue of the location of the hinge 18, the lower end of the lamp body 16 is displaced inwardly of the fender 10 and the upper end is displaced outwardly. It will be appreciated that this movement of the body 16 results in a minimum projection of the body from the confines of the housing member 14. Thus the likelihood of damage to the hinge structure and assembly by an accidental blow is minimized because of the decreased protrusion and moment arm to the hinge.

Upon completion of the refueling operation, closure of the lamp body 16 is effected by manual displacement thereof to the closed position and rotation of the operating handle 65 through a quarter-turn in the clockwise direction. It is noted that the operator must rotate the operating handle 65 to the latched position to maintain the body 16 in the closed position; otherwise the lamp body will swing to the open position indicating that the operation is not completed. This ensures that the lamp body 16 will always be closed after refueling.

Although the description of this invention has been given with respect to a particular embodiment, it is not to be construed in a limiting sense. Many variations and modifications within the spirit and scope of the invention will now occur to those skilled in the art. For a definition of the invention, reference is made to the appended claims.

We claim:

1. A vehicle rear lamp assembly adapted for movement between closed and open positions to permit access to a fuel conduit within a body panel of the vehicle comprising a lamp housing defining an access aperture adapted to be mounted in a vertical position over an opening in a body panel, a lamp body disposed in said aperture and having a peripheral edge overlapping the inner periphery of the housing, the upper and lower portions of said peripheral edge being disposed on opposite sides of the inner periphery of said housing, a hinge supporting the lamp body from the housing and having a hinge axis disposed intermediate the said upper and lower portions and spaced from the lamp body whereby it tends to swing to the open position by its own weight, and a latch on the upper end of the lamp body to secure it to the housing in the closed position.

2. The combination, a vehicle body panel enclosing a fuel tank filling conduit and defining an angular opening of L-shaped configuration extending transversely of the panel and disposed adjacent the end of the conduit, an L-shaped lamp housing secured to the body panel and defining an access aperture for the conduit, an L-shaped lamp body disposed in the access aperture and having vertically and horizontally extending peripheral edge portions overlapping the inner periphery of the housing, the vertically extending peripheral edge portion being disposed exteriorly of the housing and the horizontally extending peripheral edge portion being disposed interiorly of the housing, a hinge supporting the lamp body from the housing and having a hinge axis disposed between the vertically and horizontally extending edge portions and spaced inwardly from the lamp body whereby the body tends to swing to an open position by its own weight, and a latch on the upper portion of the lamp body to secure it to the housing in a closed position.

3. In combination, a vehicle body panel enclosing a fuel tank filling conduit and defining an angular opening of L-shaped configuration extending transversely of the panel and disposed adjacent the end of the conduit, an L-shaped lamp housing secured to the body panel and defining an access aperture for the conduit, an L-shaped lamp body disposed in the access aperture and having vertically and horizontally extending peripheral edge portions overlapping the inner periphery of the housing, the vertically extending edge portion being disposed exteriorly of the housing and the horizontally extending edge portion being disposed interiorly of the housing, a pair of spaced hinge elements on the lamp body extending inwardly of the access aperture and being connected to the lamp housing by a hinge pin defining a hinge axis spaced from the lamp body between the vertically and horizontally extending edge portions whereby the lamp body tends to swing about the hinge axis by its own weight to an open position, and a latch on the upper portion of the lamp body to secure it to the housing in the closed position.

4. In combination, a vehicle body panel enclosing a fuel tank filling conduit and defining an angular opening of L-shaped configuration extending transversly of the panel and disposed adjacent the end of the conduit, an L-shaped lamp housing secured to the body panel and defining an access aperture for the conduit, an L-shaped lamp body disposed in the access aperture and having vertically and horizontally extending peripheral edge portions overlapping the inner periphery of the housing, the vertically extending edge portion being disposed exteriorly of the housing and the horizontally extending edge portion being disposed interiorly of the housing, a pair of spaced hinge elements on the lamp body each including a stop shoulder and extending inwardly of the access aperture, a hinge pin extending through each of said hinge elements into said housing and defining a horizontal hinge axis spaced from the lamp body and disposed between the vertically and horizontally extending edge portions whereby the lamp body tends to swing about the hinge axis under its own weight to an open position, abutment portions on the lamp housing aligned with the stop shoulders for limiting the opening movement of the lamp body, a lamp mounted on the lamp body, a flexible electrical conductor connected with the lamp for energization thereof, and a latch on the upper portion of the lamp body for securing it to the housing in the closed position.

References Cited in the file of this patent

UNITED STATES PATENTS

| | | |
|---|---|---|
| 2,258,812 | Ross | Oct. 14, 1941 |
| 2,314,710 | Keller | Mar. 23, 1943 |